(12) United States Patent
He

(10) Patent No.: US 10,678,099 B2
(45) Date of Patent: Jun. 9, 2020

(54) LIQUID CRYSTAL DISPLAY PANEL AND LIQUID CRYSTAL DISPLAY DEVICE

(71) Applicant: HKC Corporation Limited, Shenzhen (CN)

(72) Inventor: Huailiang He, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/338,025

(22) PCT Filed: Aug. 15, 2018

(86) PCT No.: PCT/CN2018/100588
§ 371 (c)(1),
(2) Date: Mar. 29, 2019

(87) PCT Pub. No.: WO2019/037629
PCT Pub. Date: Feb. 28, 2019

(65) Prior Publication Data
US 2019/0235298 A1  Aug. 1, 2019

(30) Foreign Application Priority Data
Aug. 25, 2017 (CN) .......................... 2017 1 0744416

(51) Int. Cl.
*G02F 1/1339* (2006.01)
*G02F 1/1335* (2006.01)
*G02F 1/1345* (2006.01)
*G09G 3/36* (2006.01)
*G02F 1/1333* (2006.01)

(52) U.S. Cl.
CPC ........ *G02F 1/13394* (2013.01); *G02F 1/1333* (2013.01); *G02F 1/1335* (2013.01); *G02F 1/1339* (2013.01); *G02F 1/1345* (2013.01); *G02F 1/13454* (2013.01); *G02F 1/133514* (2013.01); *G09G 3/36* (2013.01); *G02F 2001/13398* (2013.01)

(58) Field of Classification Search
CPC .......... G02F 1/13394; G02F 1/133514; G02F 1/13454; G02F 1/1345; G02F 1/1355; G02F 1/1333; G02F 1/1339; G02F 2001/13398; G09G 3/36
USPC ................................................. 349/155–157
See application file for complete search history.

(56) References Cited

U.S. PATENT DOCUMENTS

2004/0017538 A1\* 1/2004 Yun ..................... G02F 1/13394
349/187

\* cited by examiner

*Primary Examiner* — Charles S Chang
(74) *Attorney, Agent, or Firm* — WPAT, PC

(57) ABSTRACT

A liquid crystal display panel and a liquid crystal display device adopting the liquid crystal display panel are provided. The liquid crystal display panel includes: a first substrate having an active area and a peripheral area, a second substrate disposed opposite to the first substrate, a pixel array circuit disposed on the first substrate and located in the active area, a driving circuit disposed on the first substrate and located in the peripheral area, a liquid crystal layer disposed between the first substrate and the second substrate, and a spacing structure disposed on the second substrate and facing towards the driving circuit. The driving circuit is connected to the pixel array circuit and configured to drive the pixel array circuit; the liquid crystal layer includes a number of liquid crystal molecules. The pixel array circuit is configured to control a motion of the liquid crystal molecules.

14 Claims, 2 Drawing Sheets

LIQUID CRYSTAL DISPLAY PANEL AND LIQUID CRYSTAL DISPLAY DEVICE

FIELD OF THE DISCLOSURE

The disclosure relates to a display field, and more particularly to a liquid crystal display panel and a liquid crystal display device.

BACKGROUND

Liquid crystal display panels are classified by the gate driver design to be a system on chip (SOC) type and a gate driver on array (GOA) type. Compared with the SOC type liquid crystal display panel, the GOA type liquid crystal display panel has the narrower border. Along with the development of science and the higher requirement on visual effects, narrowed borders of the liquid crystal display panel is the mainstream trend in the future. Therefore, the GOA type liquid crystal display panel is a more critical application compared with the SOC type liquid crystal display panel.

In an exemplary architecture of the GOA type liquid crystal display, liquid crystal (LC) molecules are filled between a top glass substrate and a bottom glass substrate and sealed by the surrounding sealant, thereby the liquid crystal molecules are fully filled on/above the GOA circuit. The liquid crystal is a polymer material, widely applied to the light and thin display technique due to the particularly physical, chemical and optical properties thereof. The liquid crystal has special optical characteristics and is sensitive to the electromagnetic field. As the liquid crystal molecules are on/above the GOA circuit in the exemplary architecture, devices in the GOA circuit can easily be affected by ionic polarization of the liquid crystal to cause residue of the direct current (DC), and a signal bus line connected with the GOA circuit is influenced by coupling to further affect the load on the signal bus line, resulting in affecting the motion of the GOA circuit to cause the unstable operation of the GOA circuit.

SUMMARY

Therefore, embodiments of the disclosure provide a liquid crystal display panel and a liquid crystal display device to improve the operational stability of a GOA circuit.

On one hand, a liquid crystal display panel is provided. The liquid crystal display panel includes: a first substrate having an active area and a peripheral area, a second substrate disposed opposite to the first substrate, a pixel array circuit disposed on the first substrate and located in the active area, a driving circuit disposed on the first substrate and located in the peripheral area, a liquid crystal layer disposed between the first substrate and the second substrate, and a spacing structure disposed on the second substrate and facing towards the driving circuit. The driving circuit is connected to the pixel array circuit and configured to drive the pixel array circuit; the liquid crystal layer includes a number of liquid crystal molecules. The pixel array circuit is configured to control a motion of the liquid crystal molecules; the spacing structure is configured to isolate the driving circuit from the liquid crystal layer.

In an embodiment of the disclosure, the driving circuit further includes a gate driver on array circuit. The gate driver on array circuit is disposed on the first substrate and located in the peripheral area. The gate driver on array circuit is connected to the pixel array circuit and is configured to drive the pixel array circuit.

In an embodiment of the disclosure, the spacing structure is corresponding to the peripheral area, and facing toward the gate driver on array circuit as well as insulating the gate driver on array circuit from the liquid crystal layer.

In an embodiment of the disclosure, the driving circuit further includes a signal bus line. The signal bus line is disposed on the first substrate and located in the peripheral area. The signal bus line is connected to the gate driver on array circuit and located on a side of gate driver on array circuit facing away from the active area.

In an embodiment of the disclosure, the spacing structure is further facing toward the signal bus line and isolating the signal bus line from the liquid crystal layer.

In an embodiment of the disclosure, the spacing structure is corresponding to the peripheral area.

In an embodiment of the disclosure, the spacing structure includes a number of spacers distributed with an identical interspace.

In an embodiment of the disclosure, the spacers are photo spacers.

In an embodiment of the disclosure, the liquid crystal display panel further includes: a color filter layer disposed on an internal side of the second substrate correspondingly to the active area, and several discrete photo spacers disposed between the pixel array circuit and the color filter layer correspondingly to the active area.

In an embodiment of the disclosure, the number of the plurality of photo spacers is three or more than three, and the photo spacers are distributed with an identical interspace.

In an embodiment of the disclosure, the color filter layer includes a red photoresist, a green photoresist and a blue photoresist. Each photoresist in the red photoresist, the green photoresist and the blue photoresist is disposed correspondingly to each of the photo spacers.

In an embodiment of the disclosure, the color filter layer includes a red photoresist, a green photoresist and a blue photoresist. Only one photoresist in the red photoresist, the green photoresist and the blue photoresist is disposed correspondingly to the photo spacers.

In an embodiment of the disclosure, the liquid crystal layer is located between the pixel array circuit and the color filter layer. The photo spacers are contacted with the color filter layer, and extended from the color filter layer to the pixel array circuit.

In an embodiment of the disclosure, the photo spacers penetrate through the liquid crystal layer.

In an embodiment of the disclosure, a material of the spacing structure is same as a material of the photo spacers.

In an embodiment of the disclosure, the liquid crystal display panel further includes a sealant. The sealant is disposed between the peripheral area of the first substrate and the second substrate, and surrounding the spacing structure. The first substrate, the second substrate and the sealant form a sealed accommodating space for housing the pixel array circuit, the liquid crystal layer, the driving circuit and the spacing structure.

On the other hand, the disclosure provides a liquid crystal display device. The liquid crystal display device includes: a backlight module configured to provide a backlight illumination, and a liquid crystal display panel. The liquid crystal display panel includes: a first substrate having an active area and a peripheral area, a second substrate disposed opposite to the first substrate, a pixel array circuit disposed on the first substrate and located in the active area, a driving circuit disposed on the first substrate and located in the peripheral area, a liquid crystal layer disposed between the first substrate and the second substrate, and a spacing structure disposed on the second substrate and facing towards the driving circuit. The driving circuit is connected to the pixel array circuit and configured to drive the pixel array circuit; the liquid crystal layer includes a number of liquid crystal molecules. The pixel array circuit is configured to control a motion of the liquid crystal molecules; the spacing structure is configured to isolate the driving circuit from the liquid crystal layer.

A liquid crystal display device includes: a backlight module configured to provide a backlight illumination, and a liquid crystal display panel. The liquid crystal display panel includes: a first substrate having an active area and a peripheral area, a second substrate disposed opposite to the first substrate, a pixel array circuit disposed on the first substrate and located in the active area, a driving circuit disposed on the first substrate and located in the peripheral area, a liquid crystal layer disposed between the active area of the first substrate and the second substrate, and a spacing structure disposed on the second substrate correspondingly to the peripheral area.

The driving circuit includes a gate driver on array circuit and a signal bus line. The gate driver on array circuit is connected to the pixel array circuit and configured to drive the pixel array circuit. The signal bus line is connected to the gate driver on array circuit and located on a side of the gate driver on array circuit facing away from the pixel array circuit; the liquid crystal layer includes a number of liquid crystal molecules. The pixel array circuit is configured to control a motion of the liquid crystal molecules; the spacing structure includes a number of spacers distributed with an identical interspace extending from the driving circuit, and are configured to insulate the driving circuit from the liquid crystal layer.

In an embodiment of the disclosure, the liquid crystal display panel further includes a color filter layer and a number of photo spacers distributed with an identical interspace. The color filter layer is disposed on the second substrate correspondingly to the active area. The liquid crystal layer is disposed between the color filter layer and the pixel array circuit. The photo spacers extend from the color filter layer to the pixel array circuit, and penetrate through the liquid crystal layer.

In an embodiment of the disclosure, the liquid crystal display panel further includes a sealant. The sealant is disposed between the peripheral area of the first substrate and the second substrate, and surrounding the spacing structure. The first substrate, the second substrate and the sealant form a sealed accommodating space for housing the pixel array circuit, the liquid crystal layer, the driving circuit, the color filter layer, the photo spacers and the spacing structure.

In the aforementioned liquid crystal display panel and liquid crystal display device, the liquid crystal display panel includes: the first substrate having the active area and the peripheral area, the second substrate disposed opposite to the first substrate, the pixel array circuit disposed on the first substrate and located in the active area, the driving circuit disposed on the first substrate and located in the peripheral area, the liquid crystal layer disposed between the first substrate and the second substrate, and the spacing structure disposed on the second substrate and facing towards the driving circuit. The driving circuit is connected to the pixel array circuit and configured to drive the pixel array circuit; the liquid crystal layer includes a number of liquid crystal molecules. The pixel array circuit is configured to control a motion of the liquid crystal molecules; the spacing structure is configured to isolate the driving circuit from the liquid crystal layer. Based on the liquid crystal display panel, the spacing structure is disposed in the liquid crystal display panel to isolate the driving circuit from the liquid crystal layer. When the driving circuit motivates the pixel array circuit to control the motion of liquid crystal molecules for operating the liquid crystal layer, the driving circuit can be prevented from the influence of the ionic polarization in the liquid crystal layer to cause residue of the direct current (DC) when the driving circuit motivates the pixel array circuit.

BRIEF DESCRIPTION OF THE DRAWINGS

The drawings illustrated herein are provided for further understanding of the disclosure and form a portion of the disclosure. Exemplary embodiments of the disclosure and the illustration thereof are for explaining the disclosure, and cannot be the improper limitation of the disclosure.

DETAILED DESCRIPTION OF PREFERRED EMBODIMENTS

Figure 1:
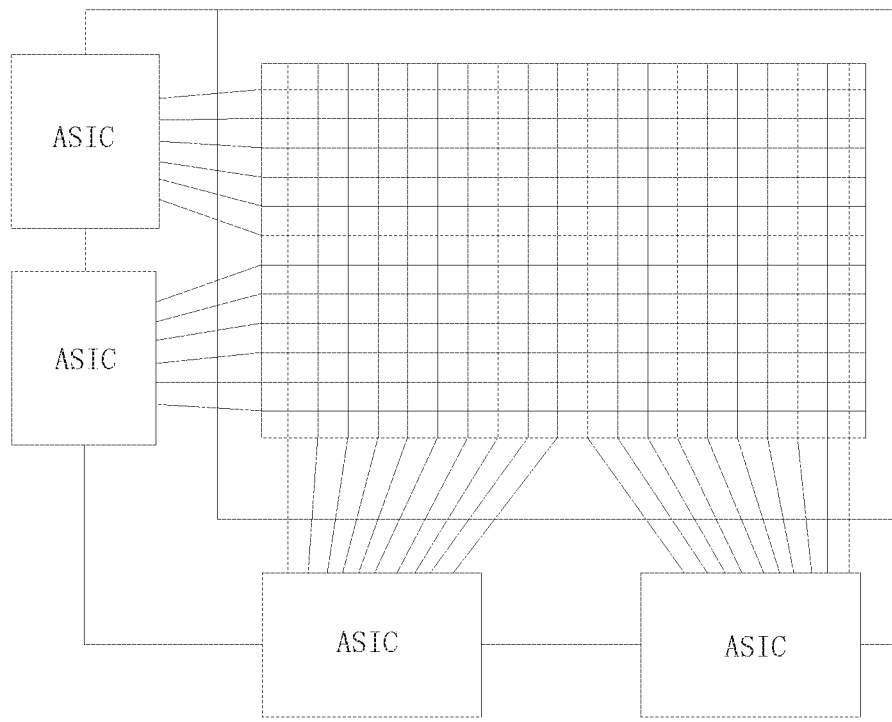
FIG. 1 is a schematic view of a SOC type liquid crystal display panel.

In order to further clarify the objective and advantage of the disclosure, the disclosure will be described in detail with reference to concrete embodiments and accompanying drawings as follows. Apparently, the illustrated drawings are merely some rather than all of the embodiments of the disclosure. All the other embodiments obtained by a person skilled in the art based on the embodiments in the disclosure without any creativity should belong to the protective scope of the disclosure.

The illustration of each embodiment is referred to the accompanying drawings for illustrating the specific embodiment to fulfill the disclosure. Directional terms mentioned in the disclosure, such as "on", "below", "front", "back", "left", "right", "inside", "outside", "lateral" and the like purely are the direction in the accompanying drawings. Therefore, the employed directional terms are for illustrating and understanding the disclosure instead of limiting the disclosure.

The drawings and the illustration are regarded as exemplary instead of restrictive. In the drawings, elements with the similar structure are represented by the same label. Moreover, for the convenience of comprehension and description, sizes and thicknesses of the devices shown in the figures are random, and the disclosure will not be restricted accordingly.

In the drawings, for the sake of clarification, thicknesses of layers, films, panels, regions, etc. are exaggerated. In the drawings, for the convenience of comprehension and description, thicknesses of some layers and regions are exaggerated. When a layer, a film, a region or an element of a base is stated to be "on" another element, the element can be directly on another element, or an intermediate element could exist.

Furthermore, in the disclosure, unless otherwise indicated, the word "include" depicts including the element without excluding any other elements.

Each embodiment of the disclosure will be illustrate in detail with reference to the accompanying drawings.

As shown in FIG. 1, FIG. 1 is a schematic view of a SOC type liquid crystal display panel. The gate driver of the SOC type liquid crystal display panel adopts an application specific integrated circuit (ASIC), but the adoption of ASIC can hardly allow the liquid crystal display panel to have narrow borders.

Figure 2:
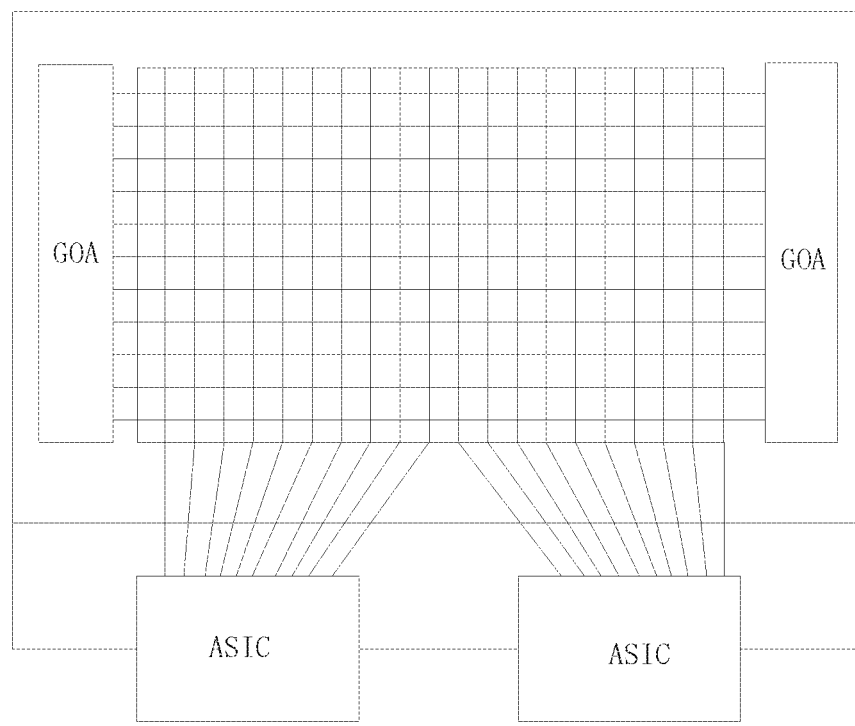
FIG. 2 is a schematic view of a GOA type liquid crystal display panel.

As shown in FIG. 2, FIG. 2 is a schematic view of a GOA type liquid crystal display panel. The gate driver of the GOA type liquid crystal display panel adopts a GOA circuit to allow the liquid crystal display panel to have narrow borders.

However, in an exemplary GOA type liquid crystal display panel, liquid crystal molecules are filled between the top substrate and the bottom substrate, and the surrounding is sealed by sealant, as the liquid crystal molecules are fully distributed on the GOA circuit, devices in the GOA circuit can easily be affected by ionic polarization of the liquid crystal to cause residue of the direct current, and a signal bus line connected with the GOA circuit is influenced by coupling to further affect the motion of the GOA circuit to cause the unstable operation of the GOA circuit.

Figure 3:
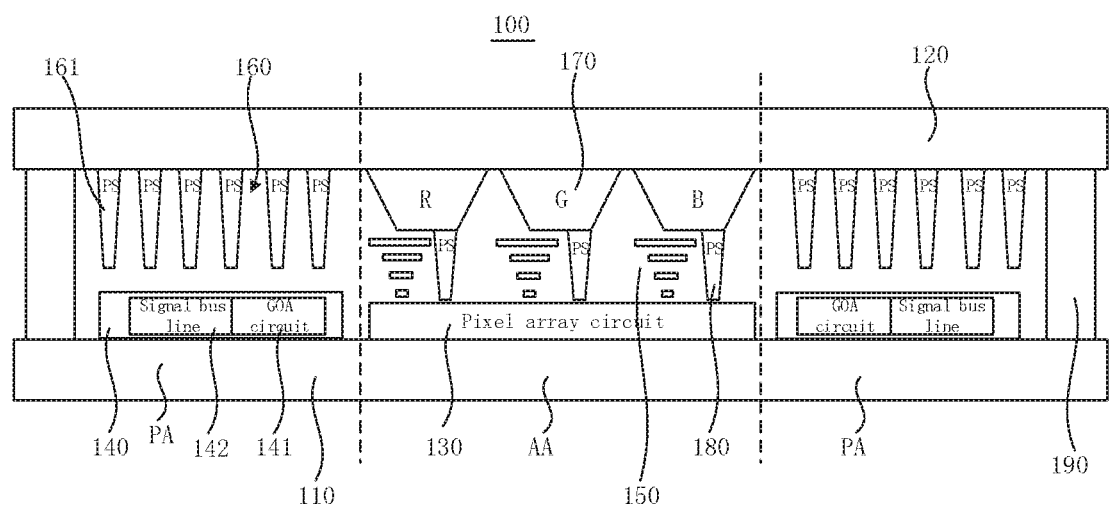
FIG. 3 is a structural schematic view of a GOA type liquid crystal display panel of an embodiment of the disclosure.

As a result, as shown in FIG. 3, the embodiment provides a liquid crystal display panel 100 capable of enhancing the operational stability of a gate driver on array circuit such as a GOA circuit. Specifically, the liquid crystal display device includes: a backlight module configured to provide a backlight illumination, and a liquid crystal display panel. The liquid crystal display panel 100 includes: a first substrate 110 having an active area AA and a peripheral area PP, a second substrate 120 disposed opposite to the first substrate 110, a pixel array circuit 130 disposed on the first substrate 110 and located in the active area AA, driving circuits 140 disposed on the first substrate 110 and located in the peripheral area PA, a liquid crystal layer 150 disposed between the first substrate 110 and the second substrate 120, and spacing structures 160 disposed on the second substrate 120 and facing towards the driving circuits 140, and a sealant 190 disposed in the peripheral area PA between the first substrate 110 and the second substrate 120 to surround the liquid crystal layer 150.

The driving circuits 140 are connected to the pixel array circuit 130 and configured to drive the pixel array circuit 130.

The liquid crystal layer 150 includes a number of liquid crystal molecules. The pixel array circuit 130 is configured to control a motion of the liquid crystal molecules.

The spacing structures 160 are configured to isolate the driving circuits 140 from the liquid crystal layer 150 and forming liquid crystal free zones above the driving circuits 140, or forming the liquid crystal free zones between the driving circuits 140 and the second substrate 120.

Each of the driving circuits 140 is located between the sealant 190 and the active area AA.

The aforementioned liquid crystal display panel includes: the first substrate having the active area and the peripheral area, the second substrate disposed opposite to the first substrate, the pixel array circuit disposed on the first substrate and located in the active area, the driving circuits disposed on the first substrate and located in the peripheral area, the liquid crystal layer disposed between the first substrate and the second substrate, and the spacing structures disposed on the second substrate and facing towards the driving circuits, and the sealant disposed in the peripheral area between the first substrate and the second substrate to surround the liquid crystal layer. The driving circuits are connected to the pixel array circuit and configured to drive the pixel array circuit; the liquid crystal layer includes a number of liquid crystal molecules. The pixel array circuit is configured to control a motion of the liquid crystal molecules; the spacing structures are configured to isolate the driving circuits from the liquid crystal layer. Based on the liquid crystal display panel above, the spacing structures are disposed in the liquid crystal display panel to isolate the driving circuits from the liquid crystal layer. When the driving circuits motivate the pixel array circuit to control the motion of liquid crystal molecules for operating the liquid crystal layer, the driving circuits can be prevented from the influence of the ionic polarization in the liquid crystal layer to cause residue of the direct current (DC) when the driving circuits motivate the pixel array circuit.

As shown in FIG. 3, the first substrate 110 has the active area AA and the peripheral area PA. The active area AA can show contents such as words, pictures, videos, music, webs, etc. The peripheral area PA generally can be disposed with driving circuits and signal bus lines to drive the active area AA to work, and the peripheral area PA typically is around the active area AA.

The first substrate 110 and the second substrate 120 commonly are transparent substrates such as glass substrates or plastic substrates. The second substrate 120 and the first substrate 110 are disposed opposite. Corresponding circuits can be disposed between the first substrate 110 and the second substrate 120.

The pixel array circuit 130 is disposed on the first substrate 110 and located in the active area AA. The pixel array circuit 130 can generate a control signal to govern the display panel driven by the driving circuits 140. Typically, the pixel array circuit 130 includes an active switch array and a pixel electrode array connected with the active switch array.

The driving circuits 140 are disposed on the first substrate 110 and located in the peripheral area. The driving circuits 140 are connected with the pixel array circuit 130 and configured to drive the pixel array circuit 130. As the gate driver of the embodiment adopts the GOA circuit, the driving circuits 140 in the embodiment include GOA circuits 141. The GOA circuits 141 are disposed on the first substrate 110 and located in the peripheral area PA. The GOA circuits are connected with pixel array circuit 130 and configured to drive the pixel array circuit 130. Correspondingly, the spacing structures 160 face toward the GOA circuits 141 to insulate the GOA circuits 141 from the liquid crystal layer 150, so as to form liquid crystal free zones between the GOA circuits 141 and the second substrate 120. Moreover, the GOA circuit typically includes cascaded shift registers and each cascaded shift register is connected to a scan line in the active area AA.

After the spacing structures 160 separate the GOA circuits 141 and the liquid crystal layer 150, ionic polarization in the liquid crystal layer 150 will not affect the GOA circuits 141, and the liquid crystal layer 150 will not influence the motion of the GOA circuits 141, resulting in stabilizing the motion of the GOA circuit 141.

In an embodiment of the disclosure, the pixel array circuit 130 includes a thin film transistor array and a transparent ITO pixel electrode array. The thin film transistor array includes several thin film transistors. The GOA circuits 141 provide the voltage to gate electrodes of the thin film transistors. The thin film transistors can be an amorphous silicon (a-Si) thin film transistor or a poly-silicon thin film transistor. The poly-silicon thin film transistor can be formed by the technique such as the low temperature poly-silicon (LTPS).

As shown in FIG. 3, the driving circuits 140 further include signal bus lines 142. The signal bus lines 142 are disposed on the first substrate 110 and located in the peripheral area PA. The signal bus lines 142 are connected with the GOA circuits 141 and located on a side of the GOA circuits 141 facing away from the active area AA. In the embodiment, the spacing structures 160 further face toward the signal bus lines 142 to separate the signal bus lines 142 from the liquid crystal layer 150 for forming liquid crystal free zones between the signal bus lines 142 and the second substrate 120. The signal bus lines 142 can provide clock signals to the GOA circuits 141.

After the spacing structures 160 insulate the signal bus lines 142 from the liquid crystal layer 150, the signal bus lines will not be influenced by the ionic polarization in the liquid crystal layer 150. As neither the GOA circuits 141 nor the signal bus lines 142 is affected by ionic polarization in the liquid crystal layer 150, the signal bus lines 142 will not be influenced by coupling to prevent the residue of the direct current.

As shown in FIG. 3, the spacing structure 160 includes several photo spacers 161. The photo spacers 161 are evenly distributed on the second substrate 120 and securely connected with the second substrate 120. The photo spacers 161 generally are formed on the second substrate 120 in a manner of processing the photosensitive resin by the photolithography. The photo spacers 161 can effectively isolate the liquid crystal molecules when the photo spacers 161 are formed above the driving circuits 140 in a proper density. The embodiment will not be restricted to the material, other proper materials are likewise adaptive. The photo spacers 161 are disposed with the same interspace, and the photo spacers 161 face toward the GOA circuits 141 and the signal bus lines 142 to separate the GOA circuits 141 and the signal bus lines 142 from the liquid crystal layer 150.

In an embodiment of the disclosure, as shown in FIG. 3, the driving circuits 140 each are located on two sides of the active area AA, such as located in the left peripheral area PA and the right peripheral area PA. The left peripheral area PA and the right peripheral area PA both are disposed with the GOA circuit 141 and the signal bus line 142. Typically in the embodiment, the GOA circuit 141 in the left peripheral area PA and the GOA circuit 141 in the right peripheral area PA are located on two opposite sides of the pixel array circuit 130, namely the opposite disposition. In the practical application, the same side of the pixel array circuit 130 can be disposed with multiple GOA circuits 141 to meet particular requirements.

Accordingly, in the embodiment, the liquid crystal display panel 100 further includes a color filter layer 170, and numerous discrete photo spacers 180.

The color filter layer 170 is disposed on the second substrate 120 correspondingly to the active area AA.

The discrete photo spacers 180 can be disposed between the pixel array circuit 130 and the color filter layer 170 in the active area AA for maintaining a proper space or cell gap between the color filter layer 170 and pixel array circuit 130. When the spacing structures 160 also employ the photo spacers 161, the spacing structures 160 can be formed together with the photo spacers 180 using the same material in one process for reducing producing costs of the spacing structures 160. A distribution density of the photo spacers 161 located in the peripheral area PA configured to form the spacing structures 160 is larger than a distribution density of the photo spacers 180 located in the active area AA configured to maintain the cell gap.

The color filter layer 170 includes multiple photoresists. The photoresists can be red (R), green (G) and blue (B) photoresists. The color filter layer 170 is disposed on the second substrate 120. Apparently, in another embodiment, in order to increase the aperture ratio, the color filter layer 170 can further be disposed on the first substrate 110, and the color filter layer 170 is consequently located between the liquid crystal layer 150 and the active switch array such as the thin film transistor array.

The color filter layer 170 can process rays. After light generated under the control of the pixel array circuit 130 passes through the color filter layer 170, the liquid crystal display panel can show the corresponding content, including words, pictures, animals, plants with corresponding colors and various colors.

The number of discrete photo spacers 180 is three or more than three, and the discrete photo spacers 180 are distributed with the same interspace. The photo spacers 180 distributed with the same interspace can keep the gap between the color filter layer 170 and the pixel array circuit 130 stable. In an embodiment of the disclosure, as shown in FIG. 3, as the color filter layer 170 generally includes a red photoresist, a green photoresist and a blue photoresist (letters R, G and B in FIG. 3 each represent the corresponding red photoresist, green photoresist and blue photoresist), thereby disposing each of the discrete photo spacers 180 correspondingly to the red R photoresist, the green G photoresist and the blue B photoresist in the embodiment. In other embodiment, the photo spacers 180 can further be disposed correspondingly to one or two photoresists. For instance, as eyes are sensitive to green light and insensitive to blue light, the photo spacers 180 can merely be disposed correspondingly to the green G photoresist in the active area AA; the red R photoresist and the blue B photoresist will not be disposed with the photo spacers 180 correspondingly. Apparently, the photo spacers 180 can purely be disposed correspondingly to the red R photoresist or the blue B photoresist.

Figure 4:
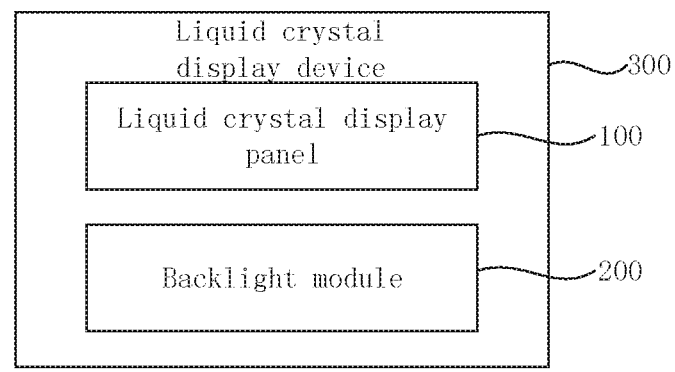
FIG. 4 is a structural schematic view of a liquid crystal display device of an embodiment of the disclosure.

The embodiment further provides a liquid crystal display device 300, as shown in FIG. 4, the liquid crystal display device 300 includes a backlight module 200 and the aforementioned liquid crystal display panel 100. The backlight module is configured to provide the backlight illumination to the liquid crystal display panel 100.

The liquid crystal display panel 300 further can include other corresponding assemblies, such as borders, power interfaces, data interfaces, etc.

The liquid crystal display device 300 can be various liquid crystal screens, such as liquid crystal displays of TVs, liquid crystal displays of computers, etc.

Based on the contents above, the liquid crystal display panel 100 includes: the first substrate having the active area and the peripheral area, the second substrate disposed opposite to the first substrate, the pixel array circuit disposed on the first substrate and located in the active area, the driving circuit disposed on the first substrate and located in the peripheral area, the liquid crystal layer disposed between the first substrate and the second substrate, and the spacing structure disposed on the second substrate and facing towards the driving circuits. The driving circuit is connected to the pixel array circuit and configured to drive the pixel array circuit; the liquid crystal layer includes a number of liquid crystal molecules. The pixel array circuit is configured to control a motion of the liquid crystal molecules; the spacing structures are configured to isolate the driving circuits from the liquid crystal layer. As the liquid crystal display device 300 in the embodiment is based on the previously mentioned liquid crystal display panel 100, therefore, the spacing structures are disposed in the liquid crystal display panel to isolate the driving circuits from the liquid crystal layer. When the driving circuits motivate the pixel array circuit to control the motion of liquid crystal molecules for operating the liquid crystal layer, the driving circuits can be prevented from the influence of the ionic polarization in the liquid crystal layer leading to residue of the direct current (DC) when the driving circuits motivate the pixel array circuit, so as to further enhance display effects of the liquid crystal display device.

The driving circuits 140 include the GOA circuits 141 acting as gate drivers. The GOA circuits 141 are disposed on the first substrate 110 and located in the peripheral area PA. The GOA circuits 141 are connected with the pixel array circuit 130 and configured to drive the pixel array circuit 130. Correspondingly, the spacing structures 160 face toward the GOA circuits 141 to insulate the GOA circuits 141 from the liquid crystal layer 150, so as to form liquid crystal free zones between the GOA circuits 141 and the second substrate 120, or form the liquid crystal free zones above the GOA circuits 141.

After the spacing structures 160 separate the GOA circuits 141 and the liquid crystal layer 150, ionic polarization in the liquid crystal layer 150 will not affect the GOA circuits 141, and the liquid crystal layer 150 will not influence the motion of the GOA circuits 141, resulting in stabilizing the motion of the GOA circuit 141 and further enhancing display effects of the liquid crystal display device 300.

As shown in FIG. 3, the driving circuits 140 further include signal bus lines 142. The signal bus lines 142 are disposed on the first substrate 110 and located in the peripheral area PA. The signal bus lines 142 are connected with the GOA circuits 141 and located on a side of the GOA circuits 141 facing away from the active area AA. In the embodiment, the spacing structures 160 further face toward the signal bus lines 142 and separate the signal bus lines 142 from the liquid crystal layer 150. After the spacing structures 160 insulate the signal bus lines 142 from the liquid crystal layer 150, the signal bus lines 142 will not be influenced by the ionic polarization in the liquid crystal layer 150. As neither the GOA circuits 141 nor the signal bus lines 142 is affected by ionic polarization in the liquid crystal layer 150, the signal bus lines 142 will not be influenced by coupling and capable of preventing the residue of the direct current.

As known from the above, the spacing structures 160 insulates the GOA circuits 141, the signal bus lines 142 and the liquid crystal layer 150 to prevent the residue of the direct current, further improving the display stability of the liquid crystal display device 300.

In order to raise the color display effect of the liquid crystal display device 300, in the embodiment, the liquid crystal display panel contained in the liquid crystal display device further includes: the color filter layer 170, and numerous discrete photo spacers 180.

The color filter layer 170 is disposed on the second substrate 120 correspondingly to the active area AA.

The discrete photo spacers 180 are disposed between the pixel array circuit 130 and the color filter layer 170 in the active area AA for maintaining a proper space or cell gap between the color filter layer 170 and pixel array circuit 130. When the spacing structures 160 also employ the photo spacers 161, the spacing structures 160 can be formed together with the photo spacers 180 using the same material in one process for reducing producing costs of the spacing structures 160. A distribution density of the photo spacers 161 located in the peripheral area PA configured to form the spacing structures 160 is larger than a distribution density of the photo spacers 180 located in the active area AA configured to maintain the cell gap.

The color filter layer 170 includes multiple photoresists. The photoresists can be red (R), green (G) and blue (B) photoresists. The color filter layer 170 is disposed on the second substrate 120. Apparently, in another embodiment, in order to increase the aperture ratio, the color filter layer 170 can further be disposed on the first substrate 110, and the color filter layer 170 is consequently located between the liquid crystal layer 150 and the active switch array such as the thin film transistor array of the pixel array circuit 130.

The color filter layer 170 can process rays. After light generated under the control of the pixel array circuit 130 passes through the color filter layer 170, the liquid crystal display panel 100 can show the corresponding content, including words, pictures, animals, plants with corresponding colors and various colors.

The number of discrete photo spacers 180 is three or more than three, and the discrete photo spacers 180 are distributed with the same interspace. The photo spacers 180 distributed with the same interspace can keep the gap between the color filter layer 170 and the pixel array circuit 130 stable. In the embodiment, as shown in FIG. 3, as the color filter layer 170 generally includes a red photoresist, a green photoresist and a blue photoresist (letters R, G and B in FIG. 3 each represent the corresponding red photoresist, green photoresist and blue photoresist), thereby disposing each of the discrete photo spacers 180 correspondingly to the red R photoresist, the green G photoresist and the blue B photoresist in the embodiment. In other embodiment, the photo spacers 180 can further be disposed correspondingly to one or two photoresists. For instance, as eyes are sensitive to green light and insensitive to blue light, the photo spacers 180 can merely be disposed correspondingly to the green G photoresist in the active area AA; the red R photoresist and the blue B photoresist will not be disposed with the photo spacers 180 correspondingly. Apparently, the photo spacers 180 can purely be disposed correspondingly to the red R photoresist or the blue B photoresist.

Meanwhile, as known from above, the liquid crystal display device 300 of the embodiment can achieve the narrow border by the GOA technology.

Furthermore, the spacing structures 160 of the aforementioned embodiments of the disclosure are unrestricted to the photo spacers 161, spacers made of other materials can further be adopted, even employing structures of other shapes, as long as the driving circuit can be insulated from the liquid crystal layer to obtain the purpose of forming liquid crystal free zones above the driving circuit.

The final declaration is, in other embodiments, the liquid crystal display panel 100 described above can be divided into modules such as an array substrate, a counter substrate, the liquid crystal layer 150 and the sealant 190. The sealant 190 is located between the array substrate and the counter substrate to form an accommodating space with the array substrate and the counter substrate. The accommodating space can be disposed to be an enclosed space. The pixel array circuit 130, the liquid crystal layer 150, the driving circuits 140, the color filter layer 170, the photo spacers 180 and the spacing structures 160 are all contained in the accommodating space. In other words, the liquid crystal layer 150 is located between the array substrate and the counter substrate and located in the accommodating space. The array substrate can include the first substrate 110, the pixel array circuit 130 and the driving circuits 140. The counter substrate includes the second substrate 120 and the color filter layer 170. The driving circuits 140 are located in the liquid crystal free zone in the accommodating space. The spacing structures 160 are located in the liquid crystal free zone in the accommodating space and securely connected with the counter substrate and facing toward the driving circuits 140. The photo spacers 180 are located in the active area AA with the liquid crystal layer 150 in the accommodating space. In brief, the accommodating space can be divided into the liquid crystal zone and the liquid crystal free zone disposed abreast in a direction (the horizontal direction in FIG. 3) perpendicular to the gap between the array substrate and the counter substrate. The liquid crystal free zone embraces and surrounds the liquid crystal zone. The spacing structures 160 are located in the liquid crystal free zone and disposed opposite to the driving circuits 140. The spacing structures 160 and the driving circuits 140 are spaced apart. The photo spacers 180 are located in the liquid crystal zone, and the liquid crystal layer 150 is located in the liquid crystal zone. Additionally, in another embodiment, the color filter layer 170 can be regarded as a component part of the array substrate rather than a component part of the counter substrate.

Phrases such as "in some embodiments" and "in various embodiments" are repeatedly used, and the phrases commonly do not depict the same embodiment; but still can have an exception. Words of "include", "have" and "contain" are synonyms unless otherwise specified.

Each technical feature in the embodiments above can be combined randomly. For the sake of concise description, all the possible combinations of the technical features in the embodiments above can hardly be introduced, however, as long as the combination of technical features is not contradictive, the combination should be included in the scope of the disclosure.

The embodiments described above purely express several embodiments of the disclosure, and the description is relatively concrete and detailed, but should not be seen as the limitation of the disclosure. A person skilled in the art can obtain some deformations and improvements within the spirit of the disclosure, and the deformations and improvements should be contained in the protective scope of the disclosure.

What is claimed is:

1. A liquid crystal display panel comprising:
a first substrate, including an active area and a peripheral area;
a second substrate, disposed opposite to the first substrate;
a pixel array circuit, disposed on the first substrate and located in the active area;
a driving circuit, disposed on the first substrate and located in the peripheral area, wherein the driving circuit is connected to the pixel array circuit and configured to drive the pixel array circuit;
a liquid crystal layer, disposed between the first substrate and the second substrate, wherein the liquid crystal layer comprises a plurality of liquid crystal molecules, the pixel array circuit is configured to control a motion of the plurality of liquid crystal molecules; and
a spacing structure, disposed on the second substrate and facing towards the driving circuit, configured to isolate the driving circuit from the liquid crystal layer;
wherein the driving circuit further comprises a gate driver on array circuit, the gate driver on array circuit is disposed on the first substrate and located in the peripheral area, the gate driver on array circuit is connected to the pixel array circuit and is configured to drive the pixel array circuit; the driving circuit further comprises a signal bus line, the signal bus line is disposed on the first substrate and located in the peripheral area, the signal bus line is connected to the gate driver on array circuit and located on a side of gate driver on array circuit facing away from the active area, the signal bus line is spaced from the pixel array circuit by the gate driver on array circuit;
wherein the liquid crystal display panel comprises: a color filter layer, disposed on an internal side of the second substrate correspondingly to the active area; and a plurality of discrete photo spacers, disposed between the pixel array circuit and the color filter layer correspondingly to the active area;
wherein the liquid crystal layer is located between the pixel array circuit and the color filter layer; the plurality of photo spacers are in direct contact with the color filter layer and extended from the color filter layer to the pixel array circuit;
wherein an end of the plurality of spacers facing away from the first substrate is more close to the second substrate in distance with respect to an end of the plurality of photo spacers facing away from the first substrate.

2. The liquid crystal display panel according to claim 1, wherein the spacing structure is corresponding to the peripheral area, and facing toward the gate driver on array circuit as well as insulating the gate driver on array circuit from the liquid crystal layer.

3. The liquid crystal display panel according to claim 1, wherein the spacing structure is further facing toward the signal bus line and isolating the signal bus line from the liquid crystal layer.

4. The liquid crystal display panel according to claim 1, wherein the spacing structure is corresponding to the peripheral area.

5. The liquid crystal display panel according to claim 4, wherein the spacing structure comprises a plurality of spacers distributed with an identical interspace.

6. The liquid crystal display panel according to claim 5, wherein the plurality of spacers are photo spacers.

7. The liquid crystal display panel according to claim 1, wherein the number of the plurality of discrete photo spacers is three or more than three, and the plurality of discrete photo spacers are distributed with an identical interspace.

8. The liquid crystal display panel according to claim 7, wherein the color filter layer comprises a red photoresist, a green photoresist and a blue photoresist, each photoresist in the red photoresist, the green photoresist and the blue photoresist is disposed correspondingly to each of the plurality of photo spacers.

9. The liquid crystal display panel according to claim 7, wherein the color filter layer comprises a red photoresist, a green photoresist and a blue photoresist, only one photoresist in the red photoresist, the green photoresist and the blue photoresist is disposed correspondingly to the plurality of photo spacers.

10. The liquid crystal display panel according to claim 1, wherein the plurality of photo spacers penetrate through the liquid crystal layer.

11. The liquid crystal display panel according to claim 1, wherein a material of the spacing structure is same as a material of the plurality of photo spacers.

12. The liquid crystal display panel according to claim 1, further comprising a sealant, wherein the sealant is disposed between the peripheral area of the first substrate and the second substrate, and surrounding the spacing structure, the first substrate, the second substrate and the sealant form a sealed accommodating space, for housing the pixel array circuit, the liquid crystal layer, the driving circuit and the spacing structure.

13. A liquid crystal display device comprising:
a backlight module, configured to provide a backlight illumination; and
a liquid crystal display panel comprising:
a first substrate, having an active area and a peripheral area;
a second substrate, disposed opposite to the first substrate;
a pixel array circuit, disposed on the first substrate and located in the active area;
a driving circuit, disposed on the first substrate and located in the peripheral area, wherein the driving circuit is connected to the pixel array circuit and configured to drive the pixel array circuit;
a liquid crystal layer, disposed between the first substrate and the second substrate, wherein the liquid crystal layer comprises a plurality of liquid crystal molecules, the pixel array circuit is configured to control a motion of the plurality of liquid crystal molecules; and
a spacing structure, disposed on the second substrate and facing towards the driving circuit, configured to isolate the driving circuit from the liquid crystal layer;
wherein the driving circuit further comprises a gate driver on array circuit, the gate driver on array circuit is disposed on the first substrate and located in the peripheral area, the gate driver on array circuit is connected to the pixel array circuit and is configured to drive the pixel array circuit; the driving circuit further comprises a signal bus line, the signal bus line is disposed on the first substrate and located in the peripheral area, the signal bus line is connected to the gate driver on array circuit and located on a side of gate driver on array circuit facing away from the active area, the signal bus line is spaced from the pixel array circuit by the gate driver on array circuit;
wherein the liquid crystal display panel comprises a color filter layer, disposed on an internal side of the second substrate correspondingly to the active area; and a plurality of discrete photo spacers, disposed between the pixel array circuit and the color filter layer correspondingly to the active area;
wherein the liquid crystal layer is located between the pixel array circuit and the color filter layer; the plurality of photo spacers are in direct contact with the color filter layer and extended from the color filter layer to the pixel array circuit;
wherein an end of the plurality of spacers facing away from the first substrate is more close to the second substrate in distance with respect to an end of the plurality of photo spacers facing away from the first substrate.

14. A liquid crystal display device comprising:
a backlight module, configured to provide a backlight illumination; and
a liquid crystal display panel comprising:
a first substrate, having an active area and a peripheral area;
a second substrate, disposed opposite to the first substrate;
a pixel array circuit, disposed on the first substrate and located in the active area;
a driving circuit, disposed on the first substrate and located in the peripheral area, wherein the driving circuit comprises a gate driver on array circuit and a signal bus line, the gate driver on array circuit is connected to the pixel array circuit and configured to drive the pixel array circuit, the signal bus line is connected to the gate driver on array circuit and located on a side of the gate driver on array circuit facing away from the pixel array circuit, and the signal bus line is spaced from the pixel array circuit by the gate driver on array circuit;
a liquid crystal layer, disposed between the active area of the first substrate and the second substrate, wherein the liquid crystal layer comprises a plurality of liquid crystal molecules, the pixel array circuit is configured to control a motion of the plurality of liquid crystal molecules; and
a spacing structure, disposed on the second substrate correspondingly to the peripheral area, wherein the spacing structure comprises a plurality of spacers distributed with an identical interspace, the plurality of spacers extend from the driving circuit, and are configured to insulate the driving circuit from the liquid crystal layer;
wherein the liquid crystal display panel further comprises:
a color filter layer, disposed on an internal side of the second substrate correspondingly to the active area; and
a plurality of discrete photo spacers, disposed between the pixel array circuit and the color filter layer correspondingly to the active area;
wherein the liquid crystal layer is located between the pixel array circuit and the color filter layer; the plurality of photo spacers are in direct contact with the color filter layer and extended from the color filter layer to the pixel array circuit;
wherein an end of the plurality of spacers facing away from the first substrate is more close to the second substrate in distance with respect to an end of the plurality of photo spacers facing away from the first substrate
wherein the liquid crystal display panel further comprises a sealant, the sealant is disposed between the peripheral area of the first substrate and the second substrate, and surrounding the spacing structure, the first substrate, the second substrate and the sealant form a sealed accommodating space, for housing the pixel array circuit, the liquid crystal layer, the driving circuit, the color filter layer, the plurality of photo spacers and the spacing structure.

* * * * *